(12) United States Patent
Samie et al.

(10) Patent No.: US 8,540,065 B2
(45) Date of Patent: Sep. 24, 2013

(54) THREE MODE SELECTION MECHANISM FOR A SELECTABLE ONE WAY CLUTCH ASSEMBLY

(75) Inventors: Farzad Samie, Franklin, MI (US);
Andrew L. Bartos, Clarkston, MI (US);
Chunhao J. Lee, Troy, MI (US); Robert K. Saley, Imlay City, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 392 days.

(21) Appl. No.: 12/964,280

(22) Filed: Dec. 9, 2010

(65) Prior Publication Data

US 2012/0145506 A1 Jun. 14, 2012

(51) Int. Cl.
*F16D 41/16* (2006.01)
*F16D 25/061* (2006.01)
*F16D 43/28* (2006.01)

(52) U.S. Cl.
USPC ...... 192/43.1; 188/82.2; 192/69.1; 192/85.18

(58) Field of Classification Search
USPC .................. 192/69.1, 85.48, 85.05; 188/82.2
See application file for complete search history.

(56) References Cited

U.S. PATENT DOCUMENTS

| 6,905,009 | B2 * | 6/2005 | Reed et al. .................... 192/43.1 |
| 7,766,790 | B2 | 8/2010 | Stevenson et al. |
| 2008/0169165 | A1 * | 7/2008 | Samie et al. .................... 192/43 |
| 2010/0022342 | A1 * | 1/2010 | Samie et al. .................. 475/144 |
| 2010/0140041 | A1 | 6/2010 | Wittkopp et al. |
| 2010/0200358 | A1 * | 8/2010 | Eisengruber et al. ........ 192/41 S |
| 2010/0255954 | A1 * | 10/2010 | Samie et al. .................... 192/43 |
| 2012/0090952 | A1 * | 4/2012 | Lee et al. .................... 192/41 R |

* cited by examiner

*Primary Examiner* — Rodney Bonck
(74) *Attorney, Agent, or Firm* — Quinn Law Group, PLLC

(57) ABSTRACT

A mode selector mechanism for a selectable one way clutch assembly includes a lever moveable between a first position, a second position and a third position. A lever biasing device biases the lever in a first direction. A piston acts in opposition against the lever biasing device to move the lever in a second direction opposite the first direction. The piston is actuated by a variable hydraulic signal. The lever is disposed in the second position when the variable hydraulic signal includes a fluid pressure between a first fluid pressure and a second fluid pressure. The lever is disposed in the third position when the variable hydraulic signal includes a fluid pressure greater than the second fluid pressure. The lever is disposed in the first position when the variable hydraulic signal includes a fluid pressure less than the first fluid pressure.

16 Claims, 4 Drawing Sheets

THREE MODE SELECTION MECHANISM FOR A SELECTABLE ONE WAY CLUTCH ASSEMBLY

TECHNICAL FIELD

The invention generally relates to a selectable one way clutch assembly, and more specifically to a mode selector mechanism for moving a slide plate of the selectable one way clutch assembly between a first mode position, a second mode position and a third mode position.

BACKGROUND

A selectable one way clutch assembly is capable of selectively transmitting a torque between an input member and an output member in a first direction of rotation or a second opposite direction of rotation. Additionally, the selectable one way clutch assembly is capable of freewheeling in one or both of the first direction and the second direction.

Selectable one way clutch assemblies typically include an outer race, an inner race concentric with the outer race about a central axis, and a plurality of struts disposed between the outer race and the inner race. A slide plate is disposed between the outer race and the inner race, and is moveable between three distinct positions, i.e., a first mode position, a second mode position and a third mode position. When in the first mode position, the slide plate interconnects the plurality of struts with the inner race and the outer race to only allow torque transmission in the first direction. When in the second mode position, the slide plate disengages the plurality of struts to allow the inner race to freewheel in both the first direction and the second direction relative to the outer race. When in the third mode position, the slide plate interconnects the plurality of struts with the inner race and the outer race to only allow torque transmission in the second direction. A mode selector mechanism moves the slide plate between the first mode position, the second mode position and the third mode position.

SUMMARY

A selectable one way clutch assembly is provided. The selectable one way clutch assembly includes an outer race and an inner race concentric with the outer race about a central axis. A plurality of struts is disposed between the outer race and the inner race. A slide plate is concentric with and disposed between the outer race and the inner race. The slide plate is rotatably moveable between a first mode position, a second mode position and a third mode position for selectively moving the plurality of struts into and out of interlocking engagement with the outer race and the inner race. The plurality of struts engages the outer race and the inner race in interlocking engagement for transmitting torque between the outer race and the inner race in a first direction when the slide plate is in the first mode position. The plurality of struts is disengaged from the inner race to allow the inner race to freewheel relative to the outer race when the slide plate is in the second mode position. The plurality of struts engages the outer race and the inner race in interlocking engagement for transmitting torque between the outer race and the inner race in a second direction opposite the first direction when the slide plate is in the third mode position. A mode selector mechanism is configured for moving the slide plate between the first mode position, the second mode position and the third mode position. The mode selector mechanism includes a lever coupled to the slide plate and moveable between a first position locating the slide plate in the first mode position, a second position locating the slide plate in the second mode position, and a third position locating the slide plate in the third mode position. A lever biasing device biases the lever in a first direction. A piston acts in opposition against the lever biasing device for moving the lever in a second direction opposite the first direction. The piston is actuated by a variable hydraulic signal.

A mode selector mechanism for moving a slide plate of a selectable one way clutch assembly between a first mode position, a second mode position and a third mode position is also provided. The mode selector mechanism includes a base, and a lever slideably coupled to the base. The lever is moveable relative to the base between a first position configured for locating the slide plate in the first mode position, a second position configured for locating the slide plate in the second mode position, and a third position configured for locating the slide plate in the third mode position. A lever biasing device biases the lever in a first direction. A piston acts in opposition against the lever biasing device for moving the lever in a second direction opposite the first direction. The piston is actuated by a variable hydraulic signal. The lever is disposed in the second position when the variable hydraulic signal includes a fluid pressure between a first fluid pressure and a second fluid pressure. The lever is disposed in the third position when the variable hydraulic signal includes a fluid pressure greater than the second fluid pressure. The lever is disposed in the first position when the variable hydraulic signal includes a fluid pressure less than the first fluid pressure.

A mode selector mechanism for moving a slide plate of a selectable one way clutch assembly between a first mode position, a second mode position and a third mode position is also provided. The mode selector mechanism includes a base and a lever. The lever includes a first end and a second end disposed opposite the first end along a longitudinal axis of the lever, and an outer edge defining a notch. The lever is slideably coupled to the base. The lever is moveable relative to the base between a first position configured for locating the slide plate in the first mode position, a second position configured for locating the slide plate in the second mode position, and a third position configured for locating the slide plate in the third mode position. A detent is configured for engaging the notch in the outer edge of the lever. A detent biasing device interconnects the detent and the base. The detent biasing device is configured for biasing the detent against the outer edge of the lever. A lever biasing device is disposed against and engages the first end of the lever. The lever biasing device biases the lever in a first direction. A piston is disposed against and engages the second end of the lever. The piston acts in opposition against the lever biasing device to move the lever in a second direction opposite the first direction. The piston is actuated by a variable hydraulic signal. The lever is disposed in the second position when the variable hydraulic signal includes a fluid pressure between a first fluid pressure and a second fluid pressure. The lever is disposed in the third position when the variable hydraulic signal includes a fluid pressure greater than the second fluid pressure. The lever is disposed in the first position when the variable hydraulic signal includes a fluid pressure less than the first fluid pressure. The detent engages the notch to secure the lever in the second position when the variable hydraulic signal is between the first fluid pressure and the second fluid pressure.

Accordingly, the mode selector mechanism utilizes only a single fluid pressure source to supply the piston with the variable hydraulic signal. Because the lever biasing device acts in opposition to the piston to move the lever, there is no need for an additional fluid pressure source, thereby reducing the complexity and the cost of the mode selector mechanism.

The above features and advantages and other features and advantages of the present invention are readily apparent from the following detailed description of the best modes for carrying out the invention when taken in connection with the accompanying drawings.

DETAILED DESCRIPTION

Referring to the Figures, wherein like numerals indicate like parts throughout the several views, a selectable one way clutch assembly is shown generally at 20. The one way clutch assembly 20 is capable of transmitting torque between a first member and a second member in a first rotational direction only, in a second rotational direction only (opposite the first rotational direction), or may alternatively disallow torque transmission between the first member and the second member, i.e., allow the first member and the second member to freewheel relative to each other.

Figure 1:
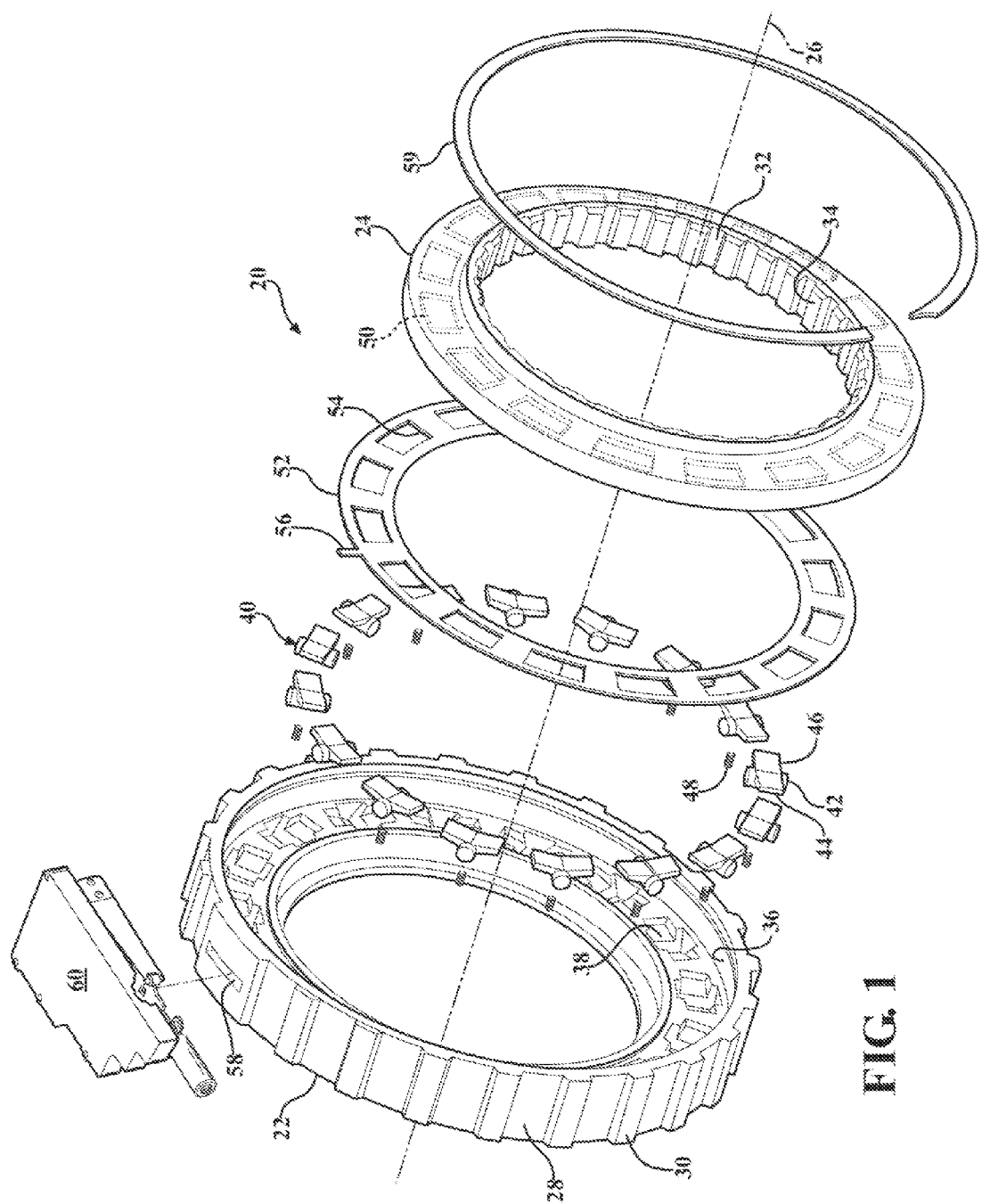
FIG. 1 is an exploded schematic perspective view of a selectable one way clutch assembly.
Figure 2:
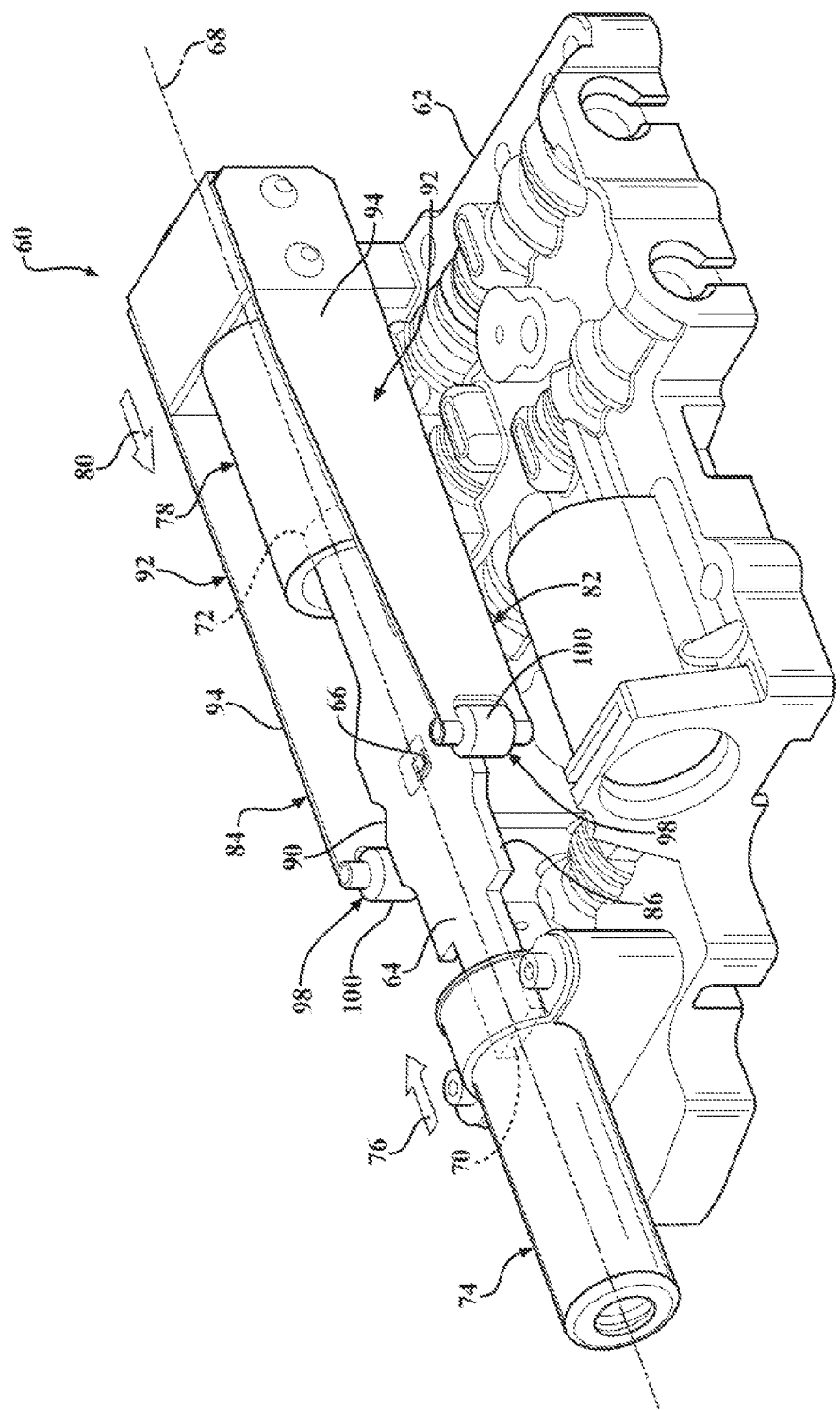
FIG. 2 is a schematic perspective view of the mode selector mechanism.
Figure 3:
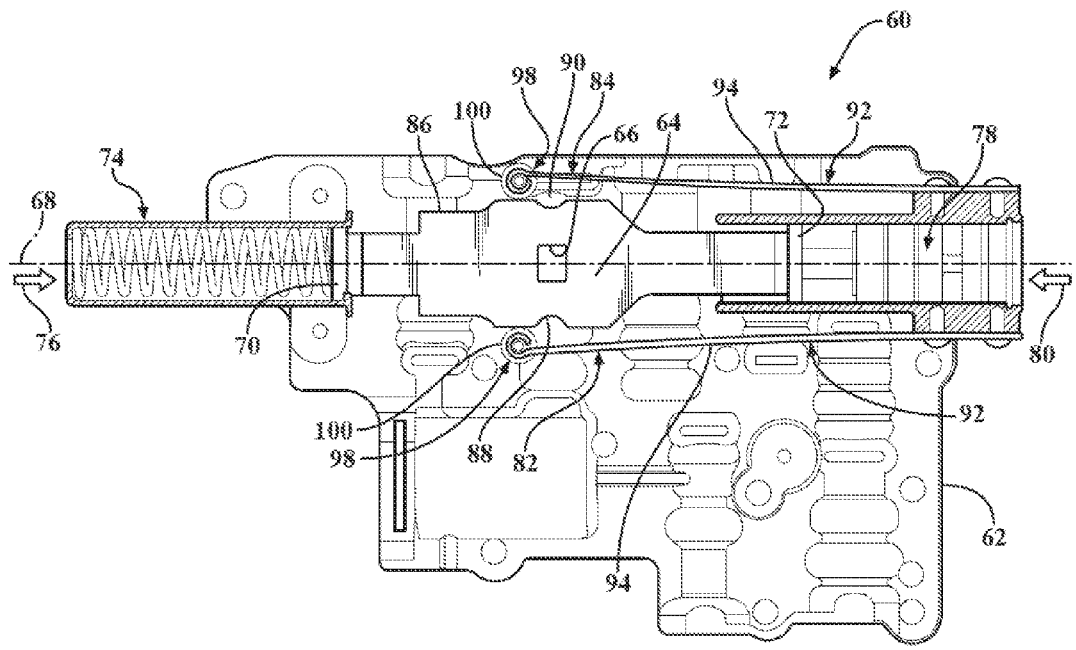
FIG. 3 is a schematic cross sectional view of the mode selector mechanism showing a lever of the mode selector mechanism in a first position.
Figure 4:
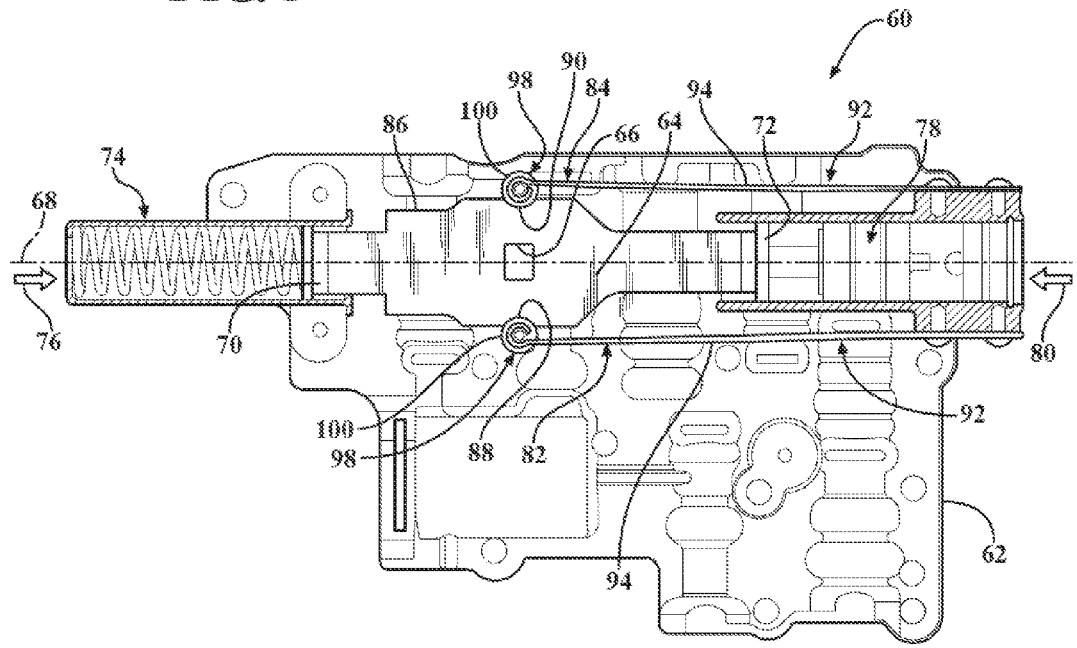
FIG. 4 is a schematic cross sectional view of the mode selector mechanism showing the lever of the mode selector mechanism in a second position.

Referring to FIG. 1, the selectable one way clutch assembly 20 includes an outer race 22 and an inner race 24. The inner race 24 is concentric with the outer race 22 about a central axis 26. The outer race 22 includes an outer wall 28 having a plurality of radially outwardly projecting teeth or splines 30 that are configured to mate with slots or grooves of a preferably stationary or grounded hub (not shown). The inner race 24 includes an inner wall 32 having a plurality of radially inward projecting teeth or splines 34 that are configured to mate with slots or grooves of a body, such as but not limited to a transmission shaft (not shown).

The outer race 22 defines a continuous annular groove 36 concentric with the central axis 26. The annular groove 36 includes a plurality of wells 38 disposed annularly about and radially spaced equidistance from the central axis 26. Each of the plurality of wells 38 supports one of a plurality of struts 40. The plurality of struts 40 is disposed between the outer race 22 and the inner race 24. Each of the plurality of struts 40 includes a central pivot portion 42 having a generally cylindrical body, a first wing portion 44 and a second wing portion 46. The first wing portion 44 extends outward from the central pivot portion 42, with the second wing portion 46 extending outward from the central pivot portion 42 in an opposite direction, yet generally planar with the first wing portion 44. A strut spring 48 is disposed within each of the plurality of wells 38 between the outer race 22 and one of the first wing portion 44 and the second wing portion 46 to bias one of the first wing portion 44 and the second wing portion 46 outward away from the outer race 22, and thereby causing the other of the first wing portion 44 and the second wing portion 46 to pivot about the central pivot portion 42 and inward toward the outer race 22.

The inner race 24 defines a plurality of depressions 50, similar in shape and size to the plurality of wells 38 defined by the outer race 22. Each of the plurality of depressions 50 is aligned with one of the plurality of struts 40. Accordingly, when one of the first wing portions 44 or the second wing portions 46 of the struts 40 are biased outwardly away from the outer race 22, the first wing portions 44 or the second wing portions 46 engage the depressions 50 to transmit torque between the outer race 22 and the inner race 24.

A slide plate 52 is disposed between the outer race 22 and the inner race 24, and is concentric with the outer race 22 and the inner race 24 about the central axis 26. The slide plate 52 defines a plurality of windows 54, with each of the plurality of windows 54 aligning with one of the plurality of struts 40. The windows 54 allow the first wing portions 44 or the second wing portions 46 of the struts 40 to extend through the slide plate 52 and engage the depressions 50 of the inner race 24 in interlocking engagement.

The slide plate 52 further includes a tab 56 extending radially outward away from the central axis 26. The tab 56 may extend through an elongated slot 58 extending through the outer wall 28 of the outer race 22. The tab 56 is engaged by a mode selector mechanism 60 described in detail below to rotate the slide plate 52 about the central axis 26.

The slide plate 52 is rotatably moveable about the central axis 26 between a first mode position, a second mode position and a third mode position. The slide plate 52 rotates between the first mode position, the second mode position and the third mode position to selectively move the plurality of struts 40 into and out of interlocking engagement with the outer race 22 and the inner race 24.

When the slide plate 52 is disposed in the first mode position, the first wing portions 44 of the struts 40 are positioned to extend through the windows 54 of the slide plate 52 and engage the inner race 24 in interlocking engagement for transmitting torque in a first rotational direction. When in the first mode position, the inner race 24 may freewheel relative to the outer race 22 in the second rotational direction. As such, torque may only be transmitted in the first rotational direction. Accordingly, the plurality of struts 40 engage the outer race 22 and the inner race 24 in interlocking engagement for transmitting torque between the outer race 22 and the inner race 24 in the first rotational direction when the slide plate 52 is in the first mode position. When the slide plate 52 is disposed in the second mode position, both the first wing portions 44 and the second wing portions 46 are positioned to not extend through the windows 54 of the slide plate 52, thereby allowing the inner race 24 and the outer race 22 to freewheel relative to each other, and not transmit a torque between the inner race 24 and the outer race 22. Accordingly, the plurality of struts 40 is disengaged from the inner race 24 to allow the inner race 24 to freewheel relative to the outer race 22 when the slide plate 52 is in the second mode position. When the slide plate 52 is disposed in the third mode position, the second wing portions 46 of the struts 40 are positioned to extend through the windows 54 of the slide plate 52 and engage the inner race 24 in interlocking engagement for transmitting torque in a second rotational direction, which is opposite the first rotational direction. When in the third mode position, the inner race 24 may freewheel relative to the outer race 22 in the first rotational direction. As such, torque may only be transmitted in the second rotational direction. Accordingly, the plurality of struts 40 engage the outer race 22 and the inner race 24 in interlocking engagement for transmitting torque between the outer race 22 and the inner race 24 in the second rotational direction when the slide plate 52 is in the third mode position.

It should be appreciated that the first direction may include either a clockwise direction or a counterclockwise direction, and that the second direction will include the other of the clockwise direction and the counterclockwise direction. For example, if the first direction is defined as a clockwise direction, then the first mode position transmits torque between the outer race 22 and the inner race 24 in a clockwise direction, and the third mode position transmits torque between the outer race 22 and the inner race 24 in the counterclockwise direction.

A snap ring 59 is disposed adjacent the inner race 24, on an opposite axial side of the inner race 24 from the slide plate 52. The snap ring 59 engages the outer race 22 in interlocking engagement to secure the slide plate 52 and the inner race 24 within the annular groove 36 of the outer race 22, and to sandwich the struts 40 and the strut springs 48 within the wells 38 between the outer race 22 and the slide plate 52.

The selectable one way clutch assembly 20 described above and shown in FIG. 1 is an exemplary embodiment of a one way clutch. As such, it should be appreciated that the selectable one way clutch assembly 20 may be configured and operate other than shown and described herein. Accordingly, the scope of the claims should not be limited to the exemplary embodiment of the selectable one way clutch assembly 20 shown and described herein.

Referring to FIGS. 2 through 5, a mode selector mechanism 60 is coupled to the slide plate 52 and is configured for moving the slide plate 52 between the first mode position, the second mode position and the third mode position. The mode selector mechanism 60 may be directly attached to the outer race 22, or may be attached to some other member, and only directly attached to the slide plate 52.

The mode selector mechanism 60 includes a base 62. The base 62 may be shaped and/or configured in any suitable manner required to meet design considerations and packaging restraints. The base 62 may define one or more fluid passageways for conducting a hydraulic fluid therethrough under pressure.

The mode selector mechanism 60 includes a lever 64. The lever 64 is coupled to the slide plate 52, and is moveable between a first position shown in FIG. 3, a second position shown in FIG. 4 and a third position shown in FIG. 5. When in the first position, the lever 64 locates the slide plate 52 in the first mode position. When in the second position, the lever 64 locates the slide plate 52 in the second mode position. When in the third position, the lever 64 locates the slide plate 52 in the third mode position.

The lever 64 defines a slot 66 sized to tightly mate with and receive the tab 56 of the slide plate 52. Accordingly, the tab 56 of the slide plate 52 is disposed within the slot 66 of the lever 64 such that movement of the lever 64, along a longitudinal axis 68 of the lever 64, between the first position, the second position and the third position causes the slide plate 52 to rotate about the central axis 26 between the first mode position, the second mode position and the third mode position. The lever 64 moves along a plane parallel with the longitudinal axis 68 of the lever 64. The longitudinal movement of the lever 64 moves the tab 56 of the slide plate 52, which causes the slide plate 52 to rotate about the central axis 26. Accordingly, it should be appreciated that there exists slight radial movement of the tab 56 of the slide plate 52 within the slot 66 of the lever 64 radially inward and outward relative to the lever 64 as the lever 64 moves between the first position, the second position and the third position.

The lever 64 includes a first end 70 and a second end 72. The second end 72 is disposed opposite the first end 70 along the longitudinal axis 68 of the lever 64. A lever biasing device 74 is disposed against and engages the first end 70 of the lever 64. The lever biasing device 74 biases the lever 64 in a first longitudinal direction, indicated by arrow 76. The lever biasing device 74 may include but is not limited to a coil spring or the like.

A piston 78 is disposed against and engages the second end 72 of the lever 64. The piston 78 acts in opposition against the lever biasing device 74 to move the lever 64 in a second longitudinal direction, indicated by arrow 80. The second longitudinal direction is opposite the first longitudinal direction. The piston 78 is actuated by a variable hydraulic signal. The variable hydraulic signal is defined herein as a hydraulic pressure signal having a variable fluid pressure. The lever 64 is disposed in the second position when the variable hydraulic signal includes a fluid pressure between a first fluid pressure and a second fluid pressure. The first fluid pressure may include but is not limited to a value equal to thirty pounds per square inch (30 psi), and the second fluid pressure may include but is not limited to a value equal to fifty pounds per square inch (50 psi). Accordingly, for this example, if the variable hydraulic signal includes a fluid pressure between thirty pounds per square inch (30 psi) and fifty pounds per square inch (50 psi), then the piston 78 acts against the lever biasing device 74 to position the lever 64 in the second position, thereby positioning the slide plate 52 in the second mode position. The lever 64 is disposed in the third position when the variable hydraulic signal includes a fluid pressure greater than the second fluid pressure. Accordingly, for this example, if the second fluid pressure includes a value equal to fifty pounds per square inch (50 psi) and the variable hydraulic signal includes a fluid pressure greater than fifty pounds per square inch (50 psi), then the piston 78 acts against the lever biasing device 74 to position the lever 64 in the third position, thereby positioning the slide plate 52 in the third mode position. The lever 64 is disposed in the first position when the variable hydraulic signal includes a fluid pressure less than the first fluid pressure. Accordingly, for this example, if the first fluid pressure includes a value equal to thirty pounds per square inch (30 psi) and the variable hydraulic signal includes a fluid pressure less than thirty pounds per square inch (30 psi), then the piston 78 acts against the lever biasing device 74 to position the lever 64 in the first position, thereby positioning the slide plate 52 in the first mode position. It should be appreciated that the first fluid pressure and the second fluid pressure may be defined to equal any suitable fluid pressure other than the values described herein.

The mode selector mechanism 60 may include a detent 82, 84. The detent 82, 84 is configured for engaging the lever 64 and securing the lever 64 in the second position when the variable hydraulic signal is between the first fluid pressure and the second fluid pressure. Accordingly, the detent 82, 84 prevents the lever 64 from moving until the variable pressure signal increases above the second fluid pressure, or drops below the first fluid pressure.

The lever 64 may include an outer edge 86 defining a notch 88, 90. The notch 88, 90 engages the detent 82, 84 when the lever 64 is in the second position. When the lever 64 is in either the first position or the third position, the notch 88, 90 is disengaged from the detent 82, 84. As shown, the notch 88, 90 includes a first notch 88 and a second notch 90. The second notch 90 is disposed opposite the first notch 88 across the longitudinal axis 68 of the lever 64 from the first notch 88. The detent 82, 84 includes a first detent 82 and a second detent 84. The second detent 84 is disposed opposite the first detent 82 across the longitudinal axis 68 of the lever 64 from the first detent 82. The first detent 82 engages the first notch 88 when the lever 64 is in the second position, and the second detent 84 engages the second notch 90 when the lever 64 is in the second position.

Figure 5:
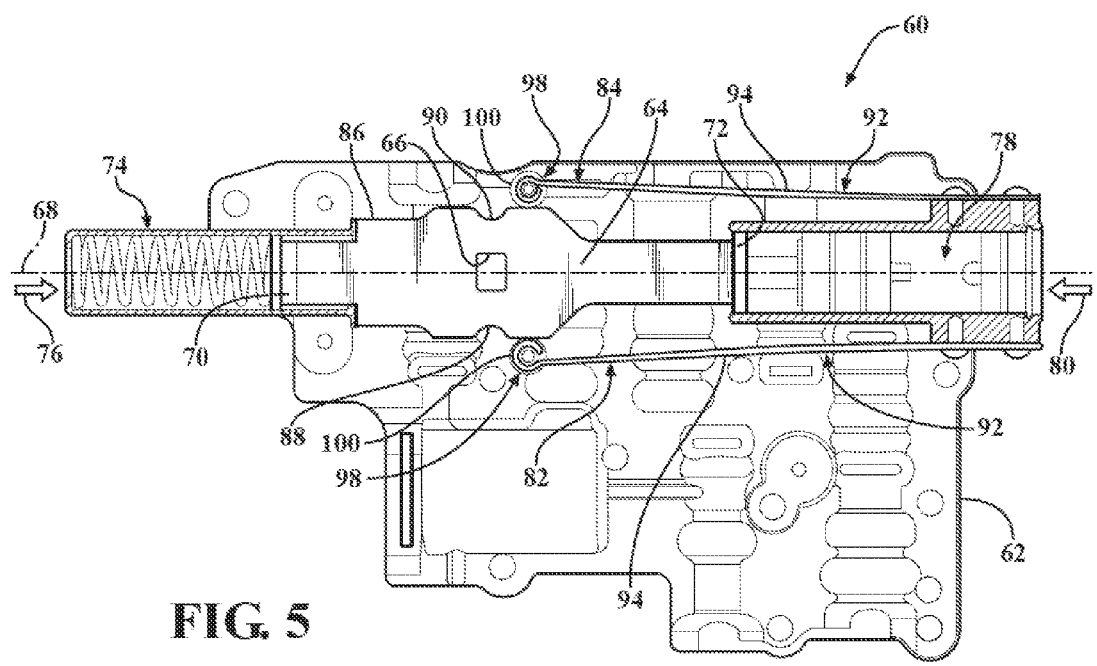
FIG. 5 is a schematic cross sectional view of the mode selector mechanism showing the lever of the mode selector mechanism in a third position.
Figure 6:
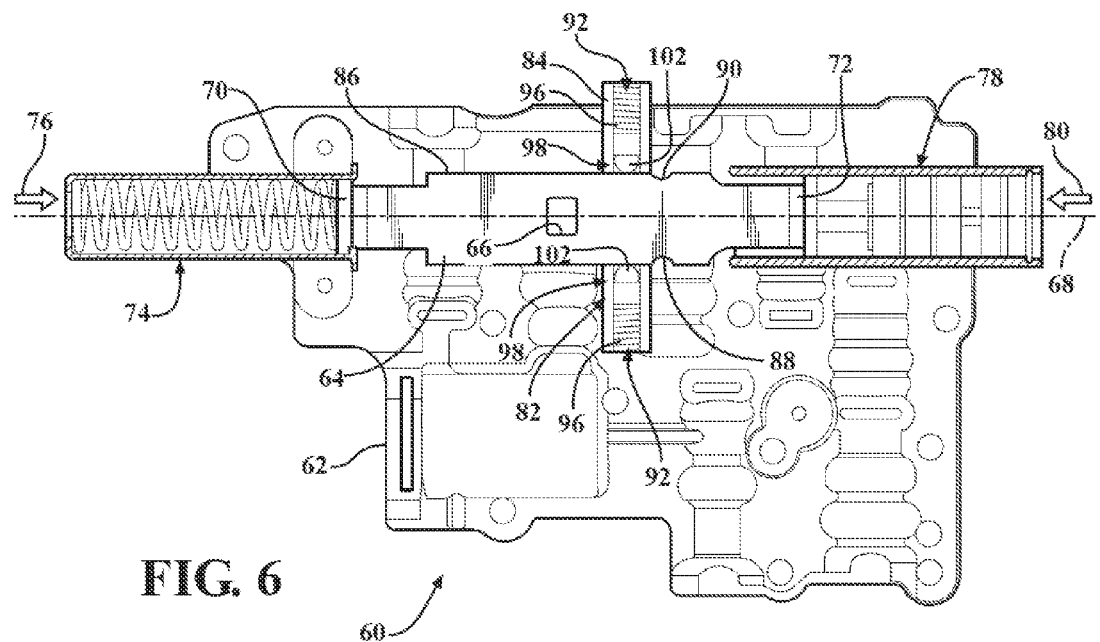
FIG. 6 is a schematic cross sectional view of an alternative embodiment of the mode selector mechanism.

The mode selector mechanism 60 may further include a detent biasing device 92. The detent biasing device 92 interconnects the detent 82, 84 and the base 62. The detent biasing device 92 is configured for biasing the detent 82, 84 against the lever 64. More specifically, the detent biasing device 92 is configured for biasing the detent 82, 84 against the outer edge 86 of the lever 64 and into pressure engagement with the notch 88, 90. The detent biasing device 92 may include one of a bar spring 94, such as shown in FIG. 5, or a coil spring 96, such as shown as an alternative embodiment of the mode selector mechanism 60 in FIG. 6.

The detent 82, 84 may include a rolling element 98 for engaging the outer edge 86 of the lever 64. The rolling element 98 is rotatable relative to the outer edge 86 of the lever 64 during the longitudinal movement of the lever 64 between the first position, the second position and the third position. The rolling element 98 may include a cylindrical roller 100, such as shown in FIG. 5, or may include a spherical roller 102, such as shown in the alternative embodiment of the mode selector mechanism 60 in FIG. 6.

While the best modes for carrying out the invention have been described in detail, those familiar with the art to which this invention relates will recognize various alternative designs and embodiments for practicing the invention within the scope of the appended claims.

The invention claimed is:

1. A selectable one way clutch assembly comprising:
   an outer race;
   an inner race concentric with the outer race about a central axis;
   a plurality of struts disposed between the outer race and the inner race;
   a slide plate concentric with and disposed between the outer race and the inner race, and rotatably moveable between a first mode position, a second mode position and a third mode position for selectively moving the plurality of struts into and out of interlocking engagement with the outer race and the inner race;
   wherein the plurality of struts engage the outer race and the inner race in interlocking engagement for transmitting torque between the outer race and the inner race in a first direction when the slide plate is in the first mode position, the plurality of struts are disengaged from the inner race to allow the inner race to freewheel relative to the outer race when the slide plate is in the second mode position, and wherein the plurality of struts engage the outer race and the inner race in interlocking engagement for transmitting torque between the outer race and the inner race in a second direction opposite the first direction when the slide plate is in the third mode position; and
   a mode selector mechanism configured for moving the slide plate between the first mode position, the second mode position and the third mode position, the mode selector mechanism including:
      a lever coupled to the slide plate and moveable between a first position locating the slide plate in the first mode position, a second position locating the slide plate in the second mode position, and a third position locating the slide plate in the third mode position;
      a lever biasing device biasing the lever in a first direction;
      a piston acting in opposition against the lever biasing device for moving the lever in a second direction opposite the first direction, wherein the piston is actuated by a variable hydraulic signal; and
      a detent configured for engaging the lever and securing the lever in the second position when the variable hydraulic signal is between the first fluid pressure and the second fluid pressure;
      wherein the detent includes a rolling element for engaging an outer edge of the lever; and
      wherein the rolling element is rotatable relative to the outer edge of the lever during movement of the lever between the first position, the second position and the third position.

2. A selectable one way clutch assembly as set forth in claim 1 wherein the lever is disposed in the second position when the variable hydraulic signal includes a fluid pressure between a first fluid pressure and a second fluid pressure.

3. A selectable one way clutch assembly as set forth in claim 2 wherein the lever is disposed in the third position when the variable hydraulic signal includes a fluid pressure greater than the second fluid pressure.

4. A selectable one way clutch assembly as set forth in claim 3 wherein the lever is disposed in the first position when the variable hydraulic signal includes a fluid pressure less than the first fluid pressure.

5. A selectable one way clutch assembly as set forth in claim 4 wherein the lever includes a first end and a second end disposed opposite the first end along a longitudinal axis of the lever, wherein the lever biasing device is disposed against and engages the first end of the lever and the piston is disposed against and engages the second end of the lever.

6. A selectable one way clutch assembly as set forth in claim 4 wherein the slide plate includes a tab extending radially outward, and the lever defines a slot, wherein the tab of the slide plate is disposed within the slot of the lever such that movement of the lever along the longitudinal axis between the first position, the second position and the third position causes the slide plate to rotate about the central axis between the first mode position, the second mode position and the third mode position.

7. A selectable one way clutch assembly as set forth in claim 1 wherein the mode selector mechanism includes a base and a detent biasing device interconnecting the detent and the base, with the detent biasing device configured for biasing the detent against the lever.

8. A selectable one way clutch assembly as set forth in claim 7 wherein the detent biasing device includes one of a bar spring or a coil spring.

9. A selectable one way clutch assembly as set forth in claim 1 wherein the lever includes an outer edge defining a notch for engaging the detent when the lever is in the second position.

10. A selectable one way clutch assembly as set forth in claim 9 wherein the notch includes a first notch and a second notch disposed opposite the first notch across the longitudinal axis of the lever from the first notch, and wherein the detent includes a first detent and a second detent disposed opposite the first detent across the longitudinal axis of the lever from the first detent, with the first detent engaging the first notch and the second detent engaging the second notch when the lever is in the second position.

11. A selectable one way clutch assembly as set forth in claim 1 wherein the lever biasing device includes a coil spring.

12. A mode selector mechanism for moving a slide plate of a selectable one way clutch assembly between a first mode position, a second mode position and a third mode position, the mode selector mechanism comprising:

a base;

a lever slideably coupled to the base and moveable relative to the base between a first position configured for locating the slide plate in the first mode position, a second position configured for locating the slide plate in the second mode position, and a third position configured for locating the slide plate in the third mode position;

a lever biasing device biasing the lever in a first direction;

a piston acting in opposition against the lever biasing device for moving the lever in a second direction opposite the first direction, wherein the piston is actuated by a variable hydraulic signal;

wherein the lever is disposed in the second position when the variable hydraulic signal includes a fluid pressure between a first fluid pressure and a second fluid pressure, the lever is disposed in the third position when the variable hydraulic signal includes a fluid pressure greater than the second fluid pressure, and the lever is disposed in the first position when the variable hydraulic signal includes a fluid pressure less than the first fluid pressures;

a detent configured for engaging the lever and securing the lever in the second position when the variable hydraulic signal is between the first fluid pressure and the second fluid pressure;

wherein the detent includes a rolling element for engaging an outer edge of the lever; and wherein the rolling element is rotatable relative to the outer edge of the lever during movement of the lever between the first position, the second position and the third position.

13. A mode selector mechanism as set forth in claim 12 wherein the lever includes a first end and a second end disposed opposite the first end along a longitudinal axis of the lever, wherein the lever biasing device is disposed against and engages the first end of the lever and the piston is disposed against and engages the second end of the lever.

14. A mode selector mechanism as set forth in claim 12 further comprising a detent biasing device interconnecting the detent and the base, with the detent biasing device configured for biasing the detent against the lever.

15. A mode selector mechanism as set forth in claim 12 wherein the lever includes an outer edge defining a notch for engaging the detent when the lever is in the second position.

16. A mode selector mechanism for moving a slide plate of a selectable one way clutch assembly between a first mode position, a second mode position and a third mode position, the mode selector mechanism comprising:

a base;

a lever having a first end and a second end disposed opposite the first end along a longitudinal axis of the lever, wherein the lever includes an outer edge defining a notch and is slideably coupled to the base and moveable relative to the base between a first position configured for locating the slide plate in the first mode position, a second position configured for locating the slide plate in the second mode position, and a third position configured for locating the slide plate in the third mode position;

a detent configured for engaging the notch in the outer edge of the lever to secure the lever in the second position when the variable hydraulic signal is between the first fluid pressure and the second fluid pressure, wherein the detent includes a rolling element for engaging the outer edge of the lever, with the rolling element rotatable relative to the outer edge of the lever during movement of the lever between the first position, the second position and the third position;

a detent biasing device interconnecting the detent and the base, with the detent biasing device configured for biasing the detent against the outer edge of the lever;

a lever biasing device disposed against and engaging the first end of the lever for biasing the lever in a first direction; and a piston disposed against and engaging the second end of the lever for acting in opposition against the lever biasing device to move the lever in a second direction opposite the first direction, wherein the piston is actuated by a variable hydraulic signal;

wherein the lever is disposed in the second position when the variable hydraulic signal includes a fluid pressure between a first fluid pressure and a second fluid pressure, the lever is disposed in the third position when the variable hydraulic signal includes a fluid pressure greater than the second fluid pressure, and the lever is disposed in the first position when the variable hydraulic signal includes a fluid pressure less than the first fluid pressure; and wherein the detent engages the notch to secure the lever in the second position when the variable hydraulic signal is between the first fluid pressure and the second fluid pressure.

\* \* \* \* \*